(12) United States Patent
Burky, Jr.

(10) Patent No.: US 9,360,097 B2
(45) Date of Patent: Jun. 7, 2016

(54) LANCED DRIVE PLATE

(71) Applicant: Schaeffler Technologies GmbH & Co. KG, Herzogenaurach (DE)

(72) Inventor: David Burky, Jr., Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/185,004

(22) Filed: Feb. 20, 2014

(65) Prior Publication Data

US 2014/0238806 A1    Aug. 28, 2014

Related U.S. Application Data

(60) Provisional application No. 61/770,650, filed on Feb. 28, 2013.

(51) Int. Cl.
*F16D 3/79* (2006.01)
*F16H 41/24* (2006.01)
*F16D 1/10* (2006.01)
*B60K 17/02* (2006.01)

(52) U.S. Cl.
CPC ............. *F16H 41/24* (2013.01); *F16D 1/101* (2013.01); *B60K 17/02* (2013.01)

(58) Field of Classification Search
CPC ........... F16D 1/101; F16D 3/79; F16H 41/24; B60K 17/02

USPC .............. 464/23, 98, 99; 403/27, 327, 291; 192/3.21, 3.28, 112; 73/862.08; 74/606 R

See application file for complete search history.

(56) References Cited

U.S. PATENT DOCUMENTS

| 2,079,888 | A | * | 5/1937 | Wemp | 192/112 |
| 2,251,722 | A | * | 8/1941 | Thomas | 464/98 X |
| 2011/0250975 | A1 | | 10/2011 | Avins | |

FOREIGN PATENT DOCUMENTS

| DE | 40 16 235 C1 | * | 9/1991 | 464/98 |
| GB | 15368 | * | 0/1905 | |

* cited by examiner

*Primary Examiner* — Gregory Binda
(74) *Attorney, Agent, or Firm* — Simpson & Simpson, PLLC

(57) ABSTRACT

A multi-use drive plate for a torque converter that includes an annular shaped inner portion defining a openings for connection to a front cover of a torque converter and an outer portion with a plurality of openings for receiving fasteners for connection to a motive force, such as an engine. A plurality of test tabs disposed axially from the annular shaped inner portion and extending radially outward each define a receiver opening with ramp surfaces on the annular shaped inner portion that extend between each one of the plurality of test tabs. Each of the ends of the ramping surfaces terminate at the receiver opening displaced from a middle portion of the ramp surface.

15 Claims, 5 Drawing Sheets

LANCED DRIVE PLATE

This application claims the benefit priority under 35 U.S.C. §119 (e) from U.S. Provisional Application No. 61/770,650 filed Feb. 28, 2013 which application is incorporated herein by reference in its entirety.

FIELD OF THE INVENTION

The field of the present invention relates to the utilization of drive plates, more specifically the utilization of drive plates with torque converters, and still more specifically the utilization of multi-use drive plates.

BACKGROUND OF THE INVENTION

Torque converters and the associated transmissions can be configured and developed efficiently and shipped as one unit to the vehicle assembly facility. Both are complex assemblies with hydraulics, pumps, seals, and connections that must be tested before final installation into the vehicle. For this reason, it is more efficient for the torque converter-transmission assembly to be tested before connecting the assembly with an engine. Test machines have been developed to test the torque converter-transmission assembly ("assembly"). However, one problem in the testing process is to develop a method and/or apparatus that enables quick and easy attachment of the assembly to the test device, and is strong enough to transmit sufficient force to the assembly to perform a satisfactory test. Therefore, there is a need in the field for a strong attachment component that can be linked to a test machine without the need for a prolonged process of attaching and removing a series of fastening devices such as nut and bolt assemblies.

Drive plates are attached to the front cover of the torque converter and are regularly used to connect a torque converter to an engine. Typically, drive plates are attached during manufacture of the torque converter. Consequently, they provide a potential link to the testing device that would be strong enough to withstand the torque applied to the transmission assembly during the testing process.

Therefore, there exists in the field a need to develop a drive plate that can be used to quickly link the torque converter assembly to a test machine, while still able to properly link the torque converter-transmission assembly to the engine of a drive train.

SUMMARY OF THE INVENTION

The present invention broadly comprises a multi-use drive plate for a torque converter comprising an annular shaped inner portion; an outer portion having a top surface and a bottom surface, the outer portion defining a plurality of openings for receiving fasteners for connection to a motive force; a plurality of test tabs, each of the plurality of test tabs having a front and rear surface and disposed axially from the annular shaped inner portion and extending radially outward therefrom and defining a receiver opening; and, a plurality of ramp surfaces on the annular shaped inner portion and extending between each one of the plurality of test tabs and having at least one end, wherein each of the at least one ends terminates at the receiver opening displaced from a middle portion of the ramp surface.

Alternatively, the multi-use drive plate for a torque converter may be described as comprising an annular shaped inner portion; an outer portion having a top surface and a bottom surface, the outer portion defining a plurality of openings for receiving fasteners for connection to a motive force; a plurality of test tabs, each of the plurality of test tabs having a front and rear surface and defining a receiver opening and disposed axially from the annular shaped inner portion and extending radially outward therefrom; and, a continuous contact surface extending circumferentially around the annular shaped inner portion, the continuous contact surface interrupted by the receiver openings and varying in height in the axial direction relative to the plane of the annular shaped inner portion.

In one embodiment, the motive force is a device for testing torque converters and transmissions.

In a second embodiment, the motive force is a vehicle engine.

One object of the invention is to provide a device that allows efficient testing of torque converter-transmission assemblies.

A second object of the invention is to supply an attachment component that can be used for attachment to a test machine and a vehicle engine.

A third object of the invention is to enable testing of assembled torque converters and transmissions without the use of vehicle engines.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
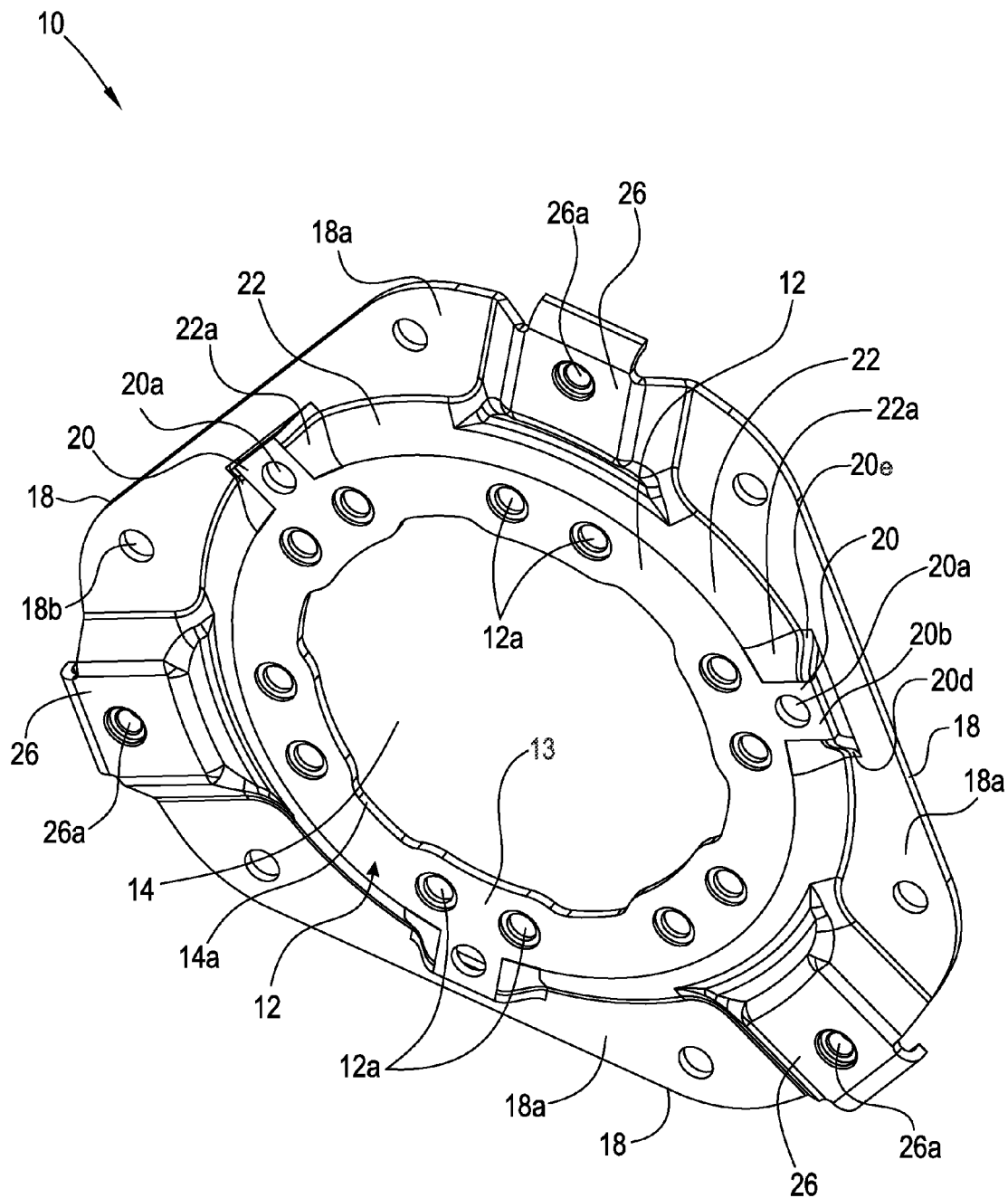
FIG. 1 is a front perspective view of the drive plate of the present invention.

Adverting to the FIGS., FIG. 1 is a front perspective view of the drive plate 10 of the present invention. Annular inner shaped portion 12 ("annular portion 12") forms a plane and defines a center opening 14. Annular portion 12 includes continuous surface 13 forming a radially innermost portion of drive plate 10. Although center opening 14 is seen as a having a periphery 14a having cutouts, persons of skill in the art will realize that periphery 14a may be a circle, square or other shape to accommodate the shape of a shaft, crankshaft mounting bolt, or portion of a torque converter cover passing through opening 14, for example. Annular portion 12 defines a plurality of openings 12a for receiving fasteners to attach drive plate 10 to the front cover of a torque converter as discussed below. Outer portion 18 forms the outer periphery of drive plate 10 and includes front surface 18a and back surface 18c (not seen in FIG. 1).

Test tabs 20 are seen extending radially outward from annular portion 12. Test tab 20 defines receiver 20a and include front surface 20b and rear surface 20c (not seen in FIG. 1.) Front surfaces 20b are flush with surface 13. It can be seen that front surface 20b of test tab 20 is displaced axially from top surface 18a by cuts 20e at the outward corners of test tab 20 ("lanced"). Edges 20d in test tabs 20 are cut (lanced) to enable this displacement.

Ramp surfaces 22 are positioned between annular portion 12 and outer portion 18 and extend circumferentially between test tabs 20. Each ramp surfaces 22 slopes partially radially outward from surface 13. Each ramp surface 22 slopes partially in an axial direction from surface 13. Each ramp surface 22 includes inclined ends 22a that rise to terminate at or near receiver 20a as discussed below. In one embodiment, front surface 20b is integral with end 22a and defines receiver opening 20a as seen in FIGS. 1 and 5A-5C as discussed below. Ends 22a are displaced from the middle portion of ramp surface 22. The middle portion is defined as the portion of ramp surface 22 positioned between ends 22a. It can be seen that annular portion 12, ramping surfaces 22, and outer portion 18 together form drive plate 10 as an integral article of manufacture. Such an integral drive plate 10 may be manufactured by methods know to those skilled in the art, for example by stamping. In this regard, holes 18b may be used as alignment guides during the stamping process. In an alternative embodiment, holes 18b may also be used as attachment holes holding drive plate 10 to the vehicle.

Alternatively, surfaces 22 may be described as a continuous contact surface 22 extending circumferentially around annular shaped inner portion 12 in which the continuous contact surface 22 is interrupted by receiver openings 20a. Continuous contact surface 22 varies in height in the axial direction relative to the plane formed by annular shaped inner portion 12.

A plurality of attachment tabs 26 is integral with outer portion 18. Attachment tabs 26 each define an attachment opening 26a. Attachment openings 26a are positioned to receive fasteners holding drive plate 10 and the attached torque converter 50 to a flex plate or other component of the vehicle engine.

Figure 2:
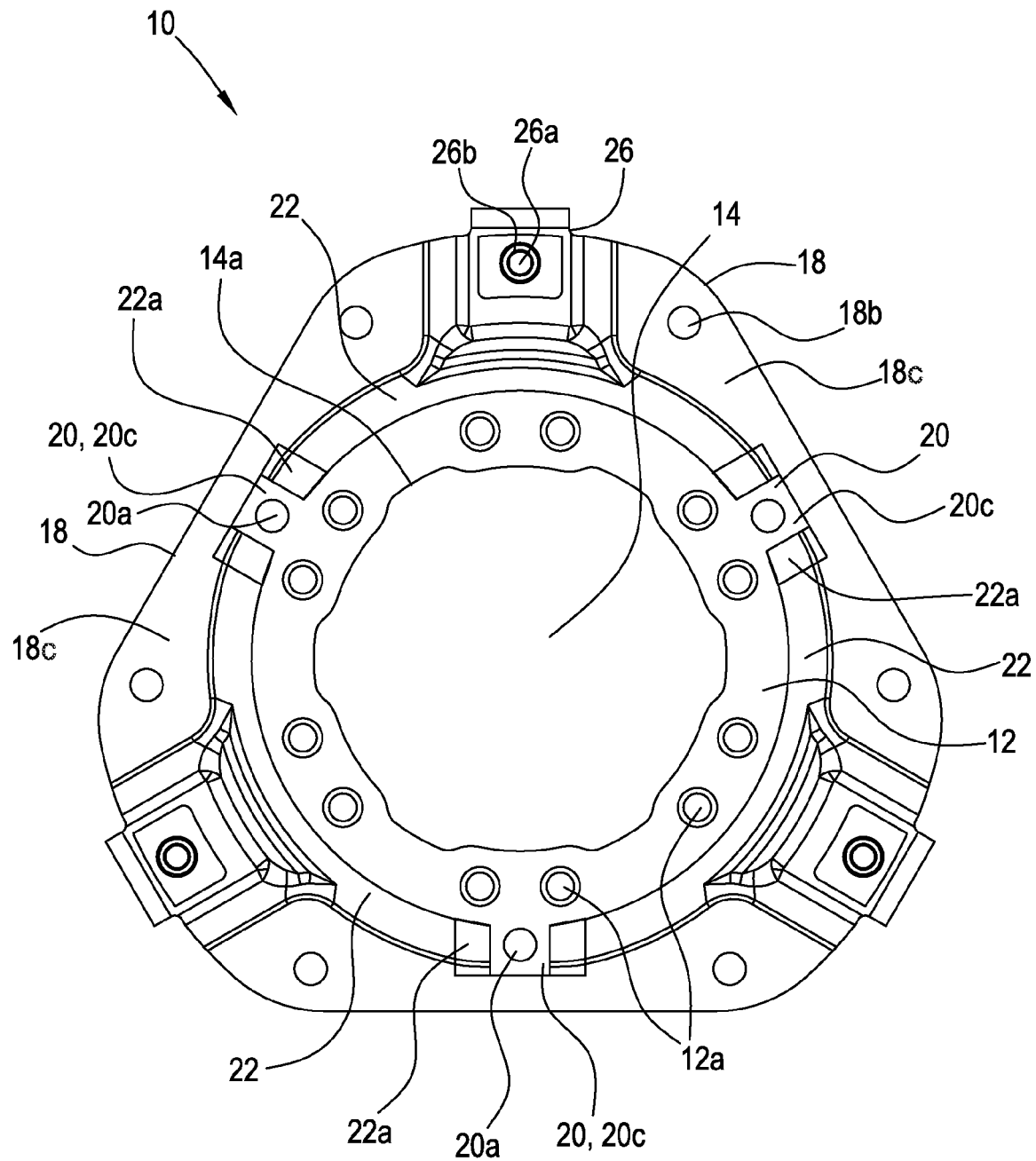
FIG. 2 is a rear view of the drive plate of the present invention.

FIG. 2 is a rear view of drive plate 10. In this view, it can be seen that outer portion bottom surface 18c is displaced axially (parallel to the axis A of drive plate 10) to test tab bottom surface 20c. Because of this displacement, ramping surfaces 22 extend between test tabs 20 with ends 22a appearing to rise toward receiver 20a (front view) or decline toward receiver 20a (rear view). FIG. 2 also shows an embodiment in which fastener 26b is fixed to the rear surface of attachment tab 26 around opening 26a. Such a fastener may be an attached nut of a nut and bolt combination. Other types of fasteners to the engine or engine flex plate are also known.

Figure 3:
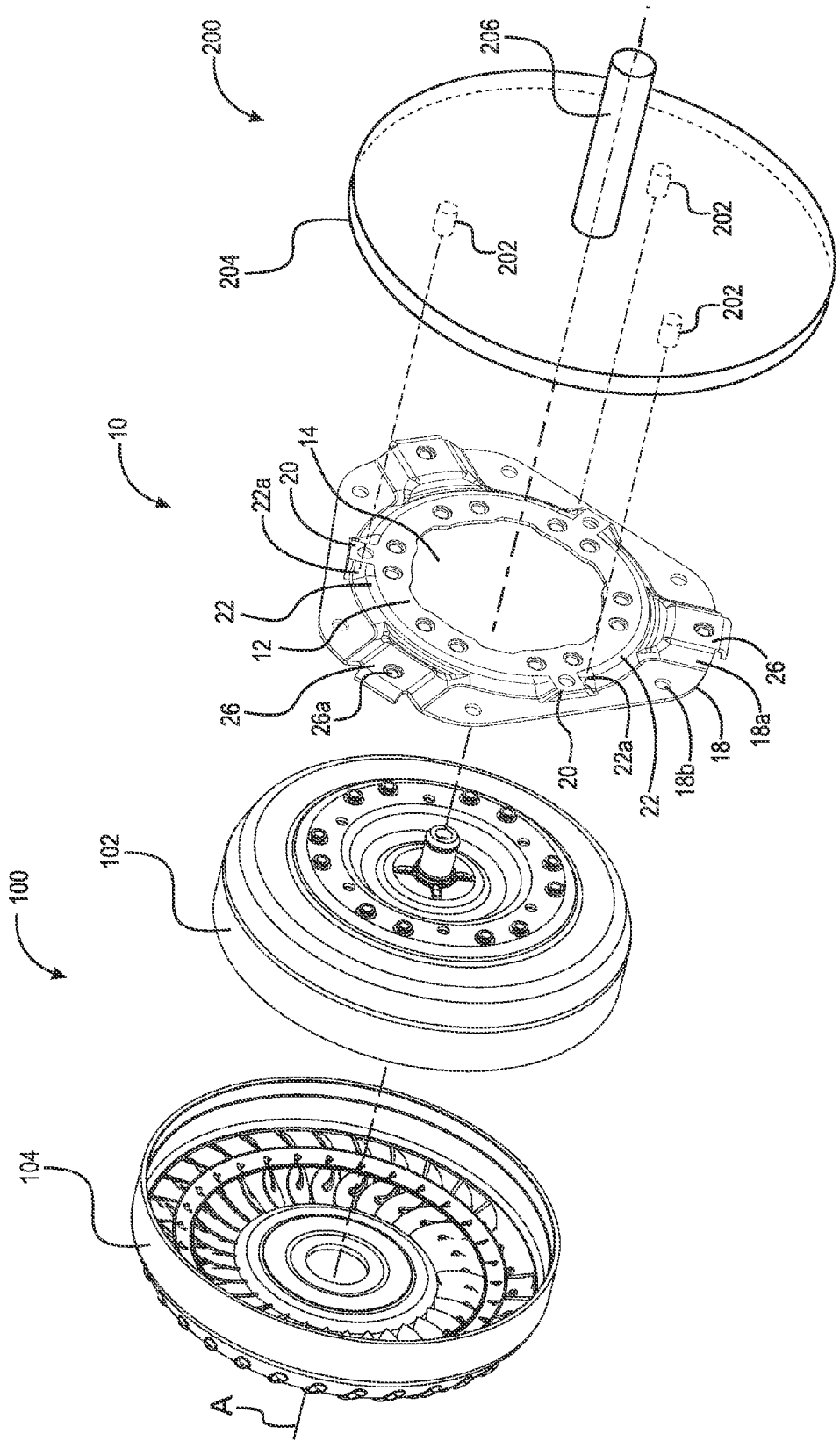
FIG. 3 is an exploded side perspective view of the torque converter-drive plate assembly along with a schematic view of a testing device.

FIG. 3 is an exploded side perspective view of the torque converter-drive plate assembly along with a schematic view of a testing device. Torque converter 100 includes front cover 102 and back cover, or impeller shell, 104. Drive plate 10 is aligned to be attached onto front cover 102 through fastener openings 12a. Such fastening may be performed using rivets on front cover 102 extending through openings 12a and then formed to hold drive plate 10 onto front cover 102. Although plate 10 is shown attached to cover 102 by riveting, any attachment method known in the art may be employed. As an example, drive plate 10 may be attached by welding or removable fasteners.

FIG. 3 also shows a schematic view of testing device 200 with projections or pins 202. In one embodiment, pins 202 are spring-biased in an extended position, i.e. away from test plate 204. As can be seen, pins 202 are in alignment with ramping surfaces 22. During testing, in one embodiment, torque converter 100 with attached drive plate 10 is moved toward test device 200. Alternatively, test device 200 may be moved toward torque converter 100. Test device 200 rotates test plate 204 and pins 202 using shaft 206 either before or after pins 202 contact ramping surfaces 22. During rotation, the pins contact and traverse ramping surfaces 22. As pins 202 contact ends 22a, the incline forces the spring-biased pins back toward test device 200. When the rotational movement brings pins 202 to one of receivers 20a, the spring forces pin 202 into receiver 20a as rotation of test device 200 continues (or restarts). Rotating pins 202 cause drive plate 10 and attached torque converter 100 to rotate allowing users to test torque converter 100 and any attached components such as a transmission.

In an alternate embodiment, plate 204 may be spring-biased to provide the force to extend pins 202 into receivers 20a. Although three pins 202 are shown, alternate embodiments may be used in which one, two or more than three pins 202 may be used. In addition, there may be more test tabs 20 on drive plate 10 than the number of pins 202 mounted on test device 200.

Figure 4:
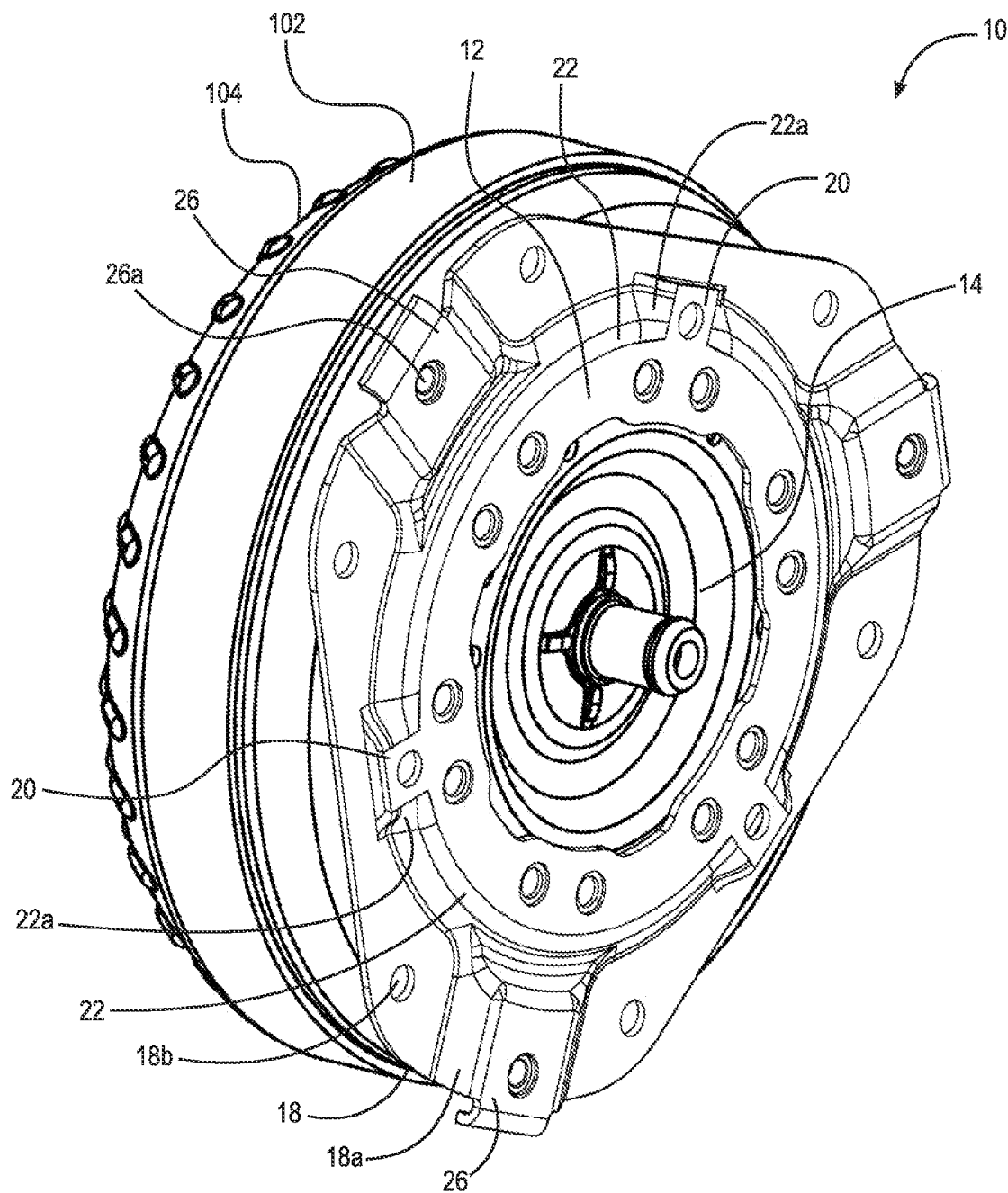
FIG. 4 is a side perspective view of the torque converter attached to the drive plate of the present invention; and, FIGS. 5A, 5B, and 5C form a series of enlarged cross section views depicting the pin contacting and traversing a ramping surface and fitting into a receiver on the drive plate of the present invention.

FIG. 4 is a side perspective view of torque converter 100 attached to drive plate 10. This assembly can be attached using attachment tabs 26 to a vehicle engine by attaching drive plate 10 to a flex plate or by other engine attachment devices known to those having skill in the art. In the embodiment shown, test tabs 20 form no part of the attachment of drive plate 10 to the engine, although in alternate embodiments, test tabs 20 may also be used as attachment tabs.

Figure 5A:
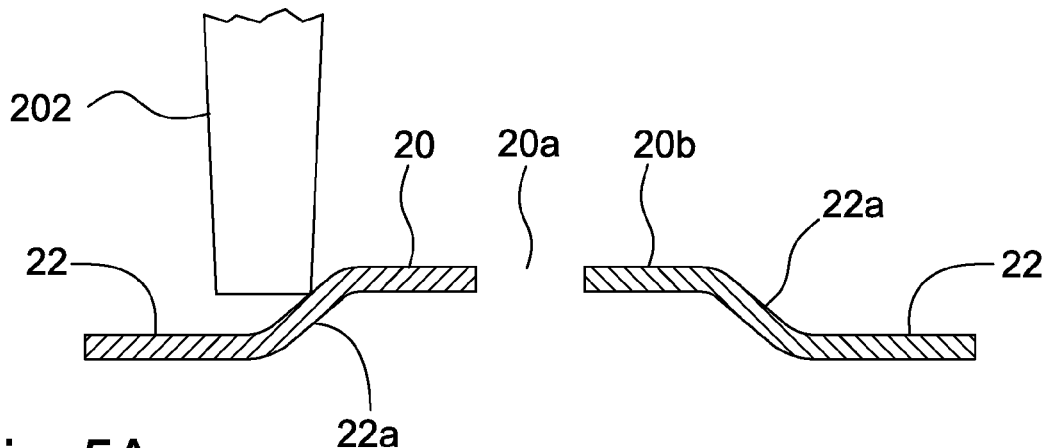
Figure 5B:
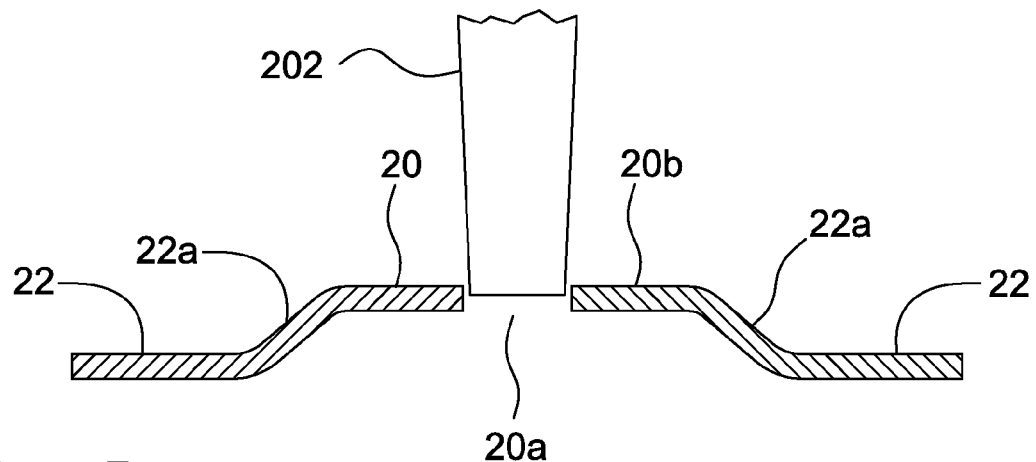
Figure 5C:
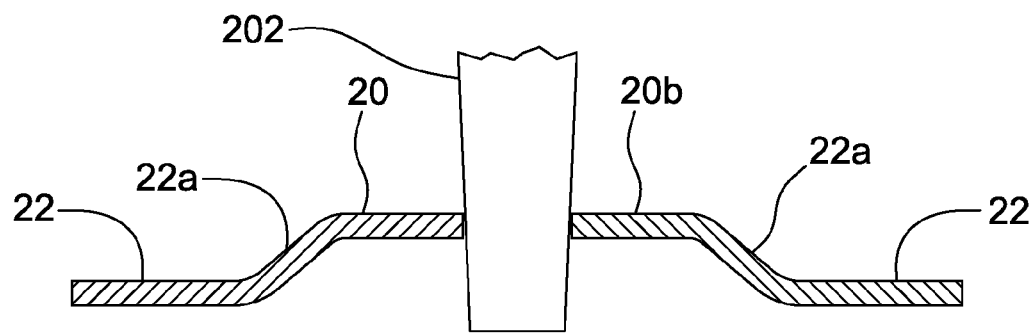

FIGS. 5A, 5B, and 5C are a series of enlarged cross section views depicting pin 202 contacting and traversing ramping surface 22 and fitting into receiver 20a. In FIG. 5A, pin 202 is contacting end 22a of ramping surface 22 where it rises toward receiver 20*a*. FIG. 5B, pin 202 is being force into receiver 20*a* by the spring that was previously compressed as spring-biased pin 202 was forced back toward plate 204 (not seen) by the movement up end 22. FIG. 5C shows pin 202 seated within receiver 20*a* to allow test device 200 to rotate the torque converter-drive plate assembly by rotational force applied to pin(s) 202.

Thus it is seen that the objects of the invention are efficiently obtained, although changes and modifications to the invention should be readily apparent to those having ordinary skill in the art, which changes would not depart from the spirit and scope of the invention as claimed.

What is claimed:

1. A multi-use drive plate for a torque converter comprising:
    an annular shaped inner portion including a continuous surface forming a radially innermost portion of the drive plate;
    an outer portion having a top surface and a bottom surface, said outer portion defining a plurality of openings for receiving fasteners for connection to a motive force;
    a plurality of test tabs, each test tab of said plurality of test tabs having a front surface:
        flush with the continuous surface of said annular shaped inner portion;
        extending radially outward from the continuous surface; and
        defining a receiver opening; and,
    a plurality of ramp surfaces on said annular shaped inner portion and extending between each one of said plurality of test tabs and having at least one end, wherein:
        each of said at least one ends terminates at said receiver opening displaced from a middle portion of said ramp surface.

2. The multi-use drive plate for a torque converter as recited in claim 1 wherein each of said front surfaces is integral with one end of said at least one end of one of said plurality of ramp surfaces.

3. The multi-use drive plate for a torque converter as recited in claim 1 wherein said front surface of said each test tab is displaced axially in a same direction from said top surface of said outer portion.

4. The multi-use drive plate for a torque converter as recited in claim 1 wherein said outer portion includes a plurality of attachment tabs, each attachment tab in said plurality of attachment tabs defining an attachment opening.

5. The multi-use drive plate for a torque converter as recited in claim 4 wherein said each attachment tab is integral with said outer portion.

6. The multi-use drive plate for a torque converter as recited in claim 1 wherein the receiver opening is configured to receive one of at least one projection from a testing device and said testing device is said motive force.

7. A multi-use drive plate for a torque converter comprising:
    an annular shaped inner portion including a continuous surface forming a radially innermost portion of the drive plate;
    an outer portion having a top surface and a bottom surface, said outer portion defining a plurality of openings for receiving fasteners for connection to a motive force; and,
    a plurality of test tabs, each test tab of said plurality of test tabs having a front surface:
        flush with the continuous surface;
        extending radially outward from the continuous surface; and
        defining a receiver opening, wherein said front surface of said each tab is displaced axially in a same direction from said top surface of said outer portion.

8. The multi-use drive plate for a torque converter as recited in claim 7 wherein said outer portion includes a plurality of attachment tabs, each attachment tab of said plurality of attachment tabs defining an attachment opening.

9. The multi-use drive plate for a torque converter as recited in claim 8 wherein said each attachment tab is integral with said outer portion.

10. The multi-use drive plate for a torque converter as recited in claim 7 wherein said receiver opening is configured to receive one of at least one projection from a testing device and said testing device is said motive force.

11. A multi-use drive plate for a torque converter comprising:
    an annular shaped inner portion including a continuous surface forming a radially innermost portion of the drive plate;
    an outer portion having a top surface and a bottom surface, said outer portion defining a plurality of openings for receiving fasteners for connection to a motive force;
    a plurality of test tabs, each test tab of said plurality of test tabs having a front surface flush with the continuous surface and extending radially outward from the continuous surface and defining a receiver opening; and,
    a plurality of ramp surfaces on said annular shaped inner portion, wherein:
        each ramp surface slopes partially radially outward from the continuous surface;
        said each ramp surface slopes partially in an axial direction from the continuous surface; and
        said each ramp surface connects a respective pair of circumferentially adjacent test tabs.

12. The multi-use drive plate for a torque converter as recited in claim 11, wherein said front surface of said each test tab is displaced axially in a same direction from said top surface of said outer portion.

13. The multi-use drive plate for a torque converter as recited in claim 11, wherein said outer portion includes a plurality of attachment tabs, each attachment tab of said plurality of attachment tabs defining an attachment opening.

14. The multi-use drive plate for a torque converter as recited in claim 13, wherein said each attachment tab is integral with said outer portion.

15. The multi-use drive plate for a torque converter as recited in claim 11, wherein the receiver opening is configured to receive one of at least one projection from a testing device and said testing device is said motive force.

* * * * *